(12) United States Patent
Glogowski et al.

(10) Patent No.: US 10,046,867 B2
(45) Date of Patent: Aug. 14, 2018

(54) MANEUVERING SYSTEM FOR EARTH ORBITING SATELLITES WITH ELECTRIC THRUSTERS

(71) Applicant: Orbital ATK Inc., Minneapolis, MN (US)

(72) Inventors: Michael Glogowski, Leesburg, VA (US); Philip Austin, Gilbert, AZ (US); Dominick Bruno, Gaithersburg, MD (US); Andre Lentati, Waynesboro, VA (US)

(73) Assignee: Orbital ATK, Inc., Minneapolis, MN (US)

( * ) Notice: Subject to any disclaimer, the term of this patent is extended or adjusted under 35 U.S.C. 154(b) by 514 days.

(21) Appl. No.: 14/858,240

(22) Filed: Sep. 18, 2015

(65) Prior Publication Data

US 2017/0081048 A1    Mar. 23, 2017

(51) Int. Cl.
*B64G 1/26* (2006.01)
*B64G 1/40* (2006.01)

(52) U.S. Cl.
CPC ....... *B64G 1/26* (2013.01); *B64G 1/40* (2013.01)

(58) Field of Classification Search
CPC .................................. B64G 1/26; B64G 1/40
USPC ........................................................ 244/169
See application file for complete search history.

(56) References Cited

U.S. PATENT DOCUMENTS

| 4,955,559 | A | | 9/1990 | Kaminskas | |
|---|---|---|---|---|---|
| 5,349,532 | A | * | 9/1994 | Tilley | B64G 1/26 244/164 |
| 6,032,904 | A | * | 3/2000 | Hosick | B64G 1/26 244/169 |
| 6,076,773 | A | * | 6/2000 | Salvatore | B64G 1/1007 244/164 |
| 6,102,337 | A | * | 8/2000 | Quartararo | B64G 1/26 244/169 |
| 6,565,043 | B1 | * | 5/2003 | Wittmann | B64G 1/242 244/169 |
| 6,637,701 | B1 | | 10/2003 | Glogowski et al. | |
| 6,679,455 | B2 | * | 1/2004 | Chatenet | B64G 1/66 244/158.1 |

(Continued)

FOREIGN PATENT DOCUMENTS

| EP | 0 937 644 A2 | 8/1999 |
|---|---|---|
| NL | 1032158 | 1/2008 |
| WO | WO 2016/181079 A1 | 11/2016 |

*Primary Examiner* — Brian M O'Hara
*Assistant Examiner* — Keith L Dixon
(74) *Attorney, Agent, or Firm* — Christensen, Fonder, Dardi & Herbert PLLC

(57) ABSTRACT

Systems and methods are described herein for mounting a thruster onto a vehicle. A thruster mounting structure may comprise a first, second, and third rotational joint, a boom, and thruster pallet, and a thruster attached to the thruster pallet. The first rotational joint may be attached to the vehicle and configured to rotate in a first axis. The first rotational joint may be connected to the boom and configured to pivot the boom about the first axis. The boom may be connected to the second rotational joint, which is connected to the third rotational joint and configured to rotate the third rotational joint in the first axis. The third rotational joint may be connected to the thruster pallet and configured to pivot the thruster pallet in a second axis that is perpendicular to the first axis.

20 Claims, 14 Drawing Sheets

(56) References Cited

U.S. PATENT DOCUMENTS

| | | | |
|---|---|---|---|
| 6,945,500 B2* | 9/2005 | Wingo | B64G 1/1078 244/159.4 |
| 9,527,607 B2 | 12/2016 | Celerier | |
| 9,573,703 B2 | 2/2017 | Celerier | |
| 9,663,251 B2* | 5/2017 | Munir | B64G 1/26 |
| 2005/0077425 A1 | 4/2005 | Payette | |
| 2014/0361123 A1 | 12/2014 | Celerier | |
| 2016/0167810 A1 | 6/2016 | Janu et al. | |
| 2017/0129627 A1 | 5/2017 | Moro et al. | |

* cited by examiner

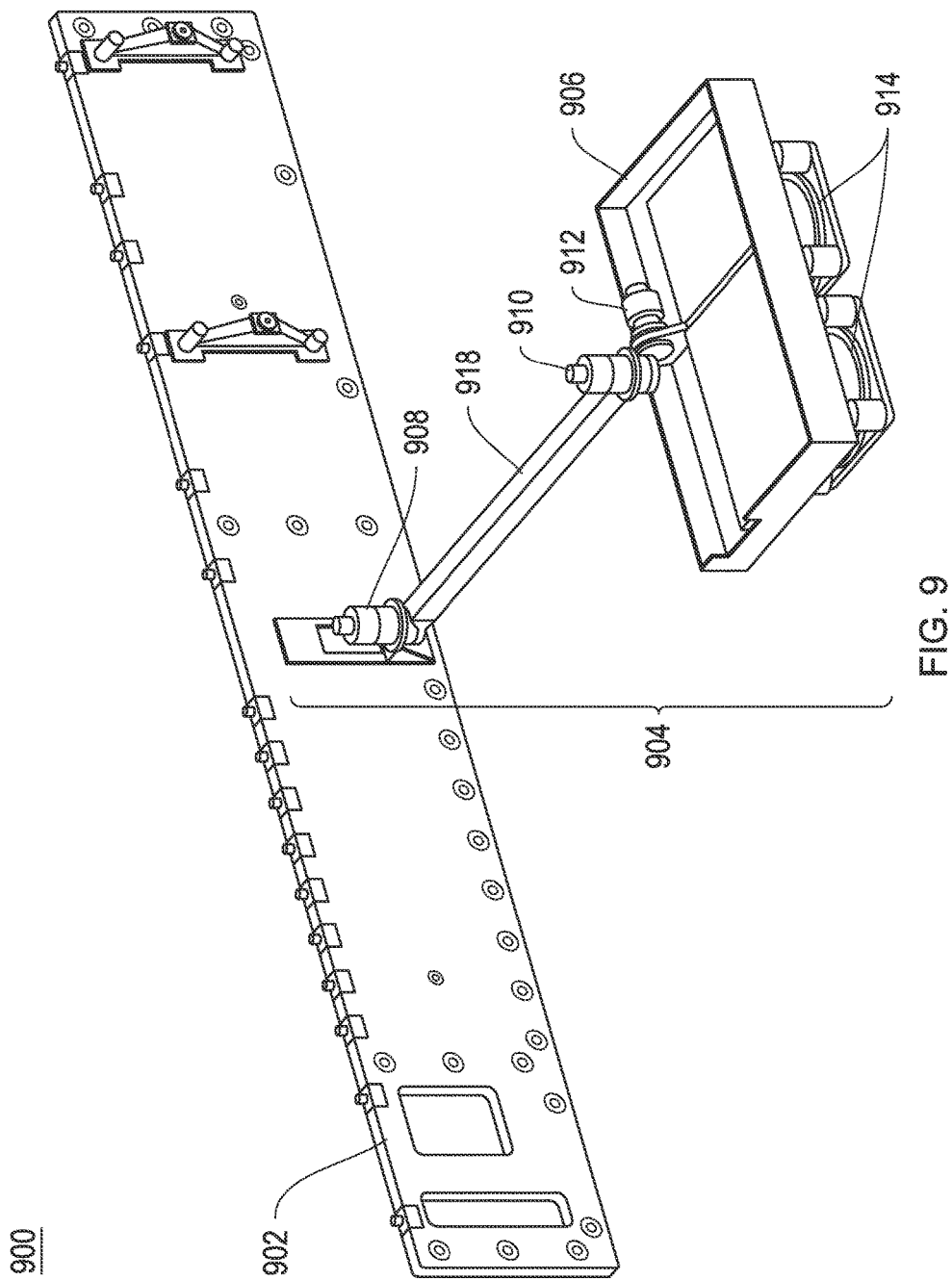

MANEUVERING SYSTEM FOR EARTH ORBITING SATELLITES WITH ELECTRIC THRUSTERS

BACKGROUND

Satellites and other spacecraft typically utilize chemical rocket propulsion systems to propel themselves into orbit and to perform mission operations. Although such propulsion systems provide relatively large amounts of thrust, rocket propulsion systems are generally propellant inefficient and have a low specific impulse. As a result, satellites and spacecraft propelled by rocket propulsion systems typically carry a large proportion of their mass as propellant, leaving a relatively small proportion of the mass available for mission payloads. Electric propulsion systems provide a viable alternative to rocket propulsion systems for long-range or long-duration missions, which require large amounts of propellant. Electric propulsion systems operate by using electric energy to expel propellant, typically particles of ionized gas, at high speeds. In this manner, they achieve a relatively high specific impulse and propellant efficiency compared to rocket propulsion systems, but produce a relatively small amount of thrust. These characteristics make electric propulsion systems suitable for long-range or long-duration missions, where the satellite and/or spacecraft may be accelerated over a long period of time.

SUMMARY

Systems and methods are described herein for mounting a thruster onto a vehicle. The system may comprise a thruster mounting structure, the thruster mounting structure comprising a first rotational joint attached to a vehicle and configured to rotate in a first axis. The thruster mounting structure may further comprise a boom connected to the first rotational joint, wherein the first rotational joint is configured to pivot the boom about the first axis. The thruster mounting structure may further comprise a second rotational joint attached to the boom and configured to rotate in the first axis. The thruster mounting structure may further comprise a third rotational joint attached to the second rotational joint and configured to rotate in a second axis that is perpendicular to the first axis. The second rotational joint may be configured to pivot the third rotational joint about the first axis. The thruster mounting structure may further comprise a thruster pallet attached to the third rotational joint, wherein the third rotational joint is configured to pivot the thruster pallet about the second axis, and a thruster that is fixedly attached to the thruster pallet. In some embodiments, the thruster pallet comprises a rectangular face, and the third rotational joint may be configured to attach to the thruster pallet along a long edge of the rectangular face.

The vehicle may be any suitable vehicle, including a satellite or other spacecraft, and may comprise any suitable shape. Although the systems and methods described herein are discussed in relation to a satellite that is shaped like a cube or a rectangular prism, other satellite and spacecraft shapes may be contemplated, as will be understood by one of skill in the art. It will also be understood that the thruster mounting structure may be mounted on any suitable surface of the vehicle, including a flat surface of a cube/rectangular prism. Other mounting surfaces may be contemplated as will be understood by those of skill in the art. Furthermore, although the systems and methods described herein are described in terms of an electric thruster, it will be understood that any suitable thruster may be utilized with the mounting structure described herein.

In some embodiments, the first axis may be a roll axis of the vehicle, and the second axis may be a yaw axis, pitch axis or a combination of pitch axis and yaw axis of the vehicle. In some embodiments, the first axis may be a yaw axis of the vehicle, and the second axis may be a roll axis, pitch axis or a combination of roll axis and pitch axis of the vehicle. In some embodiments, the first rotational joint and the second rotational joint may be motorized rotational joints. For example, the rotational joints may employ motors, servos, or any other suitable mechanism for changing and maintaining a rotational movement. In some embodiments, the rotational joints may receive control inputs to change and maintain a rotational angle. In some embodiments, the rotational joints may be configured to stiffly maintain a rotational angle until a control is received to change the rotational angle. In some embodiments, a second thruster may be connected to the thruster pallet. The second thruster may be substantially identical to the first thruster, or it may be substantially different. For instance, the second thruster may be configured to provide substantially the same thrust as the first thruster in order to act as a redundant thruster.

Through the combination of rotational joints, the thruster mounting structure may be able to orient the thruster pallet in a variety of positions, including a stowed position, a station keeping position, and an orbit raising position. In the stowed position, the boom may be positioned substantially parallel and/or flush to the vehicle and the thruster pallet may be connected to the vehicle. In some embodiments, the thruster pallet may be mated to a retaining receptacle which may secure the thruster pallet while the thruster pallet is not deployed. For example, the thruster pallet may be secured to the vehicle body during launch to minimize space and to minimize vibration and other forces on the thruster mounting structure. In some embodiments, the thruster pallet may be kept flush to the vehicle in the stowed position. In some embodiments, the thruster may be facing a direction substantially perpendicular to the vehicle or vehicle face that the thruster mounting structure is mounted to. For instance, the thruster may be faced substantially outward or substantially toward the vehicle, in a direction perpendicular to the vehicle face.

In some embodiments, the thruster mounting structure may be arranged into a station keeping position. The station keeping position, as discussed in further detail below, may encompass a wide variety of orientations intended to position the thrust vector such that an orbit of the satellite/spacecraft may be maintained. In the station keeping position, the thruster will be released from the vehicle body and manipulated using the first, second, and third rotational joints. In some embodiments, the boom will not be parallel to the vehicle in the station keeping position. In some embodiments, the boom will be kept perpendicular to the vehicle or a face of the vehicle. In some embodiments, the thrusters in the station keeping position may generate a thrust vector that points through a center of gravity of the vehicle.

In some embodiments, the thruster mounting structure may be arranged into an orbit raising position. In the orbit raising position, the boom may be positioned substantially perpendicular to the vehicle or a face of the vehicle. The thruster pallet may be released from any restraining receptacle on the vehicle body. In the orbit raising position, the thruster and/or thruster pallet may be pointed in a direction substantially parallel to the vehicle. The thruster may be spaced a distance away from the vehicle, for example, by the boom. In this manner, the thruster may be positioned to generate a thrust vector that may be used to raise or transfer an orbit of the vehicle.

In some embodiments, the system may comprise a second thruster mounting structure. The second thruster mounting structure may be substantially similar to the first thruster mounting structure. In some embodiments, the vehicle may comprise a rectangular prism shape, and the first thruster mounting structure and the second thruster mounting structure may be mounted on opposing faces of the rectangular prism. In this manner, the first thruster mounting structure and the second thruster mounting structure may be controlled independently in order to change the vehicles motion, such as orbit altitude, orbit inclination, eccentricity, and/or drift. The second thruster mounting structure may comprise a fourth rotational joint attached to a vehicle, the fourth rotational joint configured to rotate in the first axis. The fourth rotational joint may be configured to rotate in substantially the same axis as the axis of the first rotational joint of the first thruster mounting structure. The second thruster mounting structure may further comprise a second boom that may be connected to the fourth rotational joint, wherein the fourth rotational joint is configured to pivot the boom about the first axis. The second thruster mounting structure may comprise a fifth rotational joint, which may be attached to the second boom and configured to rotate in the first axis. The second thruster mounting structure may further comprise a sixth rotational joint attached to the fifth rotational joint, the sixth rotational joint configured to rotate in the second axis, and wherein the fifth rotational joint is configured to pivot the sixth rotational joint about the first axis. The second thruster mounting structure may further comprise a second thruster pallet attached to the sixth rotational joint, wherein the sixth rotational joint is configured to pivot the second thruster pallet about the second axis, and a second thruster may be fixedly attached to the second thruster pallet.

BRIEF DESCRIPTION OF THE DRAWINGS

FIG. 9 shows an illustrative diagram of a thruster mounting structure positioned in an orbit raising position.

DETAILED DESCRIPTION

To provide an overall understanding of the systems and methods described herein, certain illustrative embodiments will now be described. However, it will be understood by one of ordinary skill in the art that the systems and methods described herein can be adapted and modified for other suitable applications and that such other additions and modifications will not depart from the scope hereof.

Electric thrusters and electric thruster mounting schemes are described in greater detail in the following U.S. patent documents, which are hereby incorporated by reference herein in their entireties: U.S. Pat. No. 6,032,904, filed Feb. 23, 1998; U.S. Pat. No. 7,059,571, filed Feb. 21, 2003; U.S. Pat. No. 6,296,207, filed Jan. 27, 1999; U.S. Pat. No. 5,349,532, filed Apr. 28, 1992; U.S. Pat. No. 6,565,043, filed Dec. 21, 2001; and U.S. Pat. No. 6,637,701 filed Apr. 3, 2002.

Figure 1:
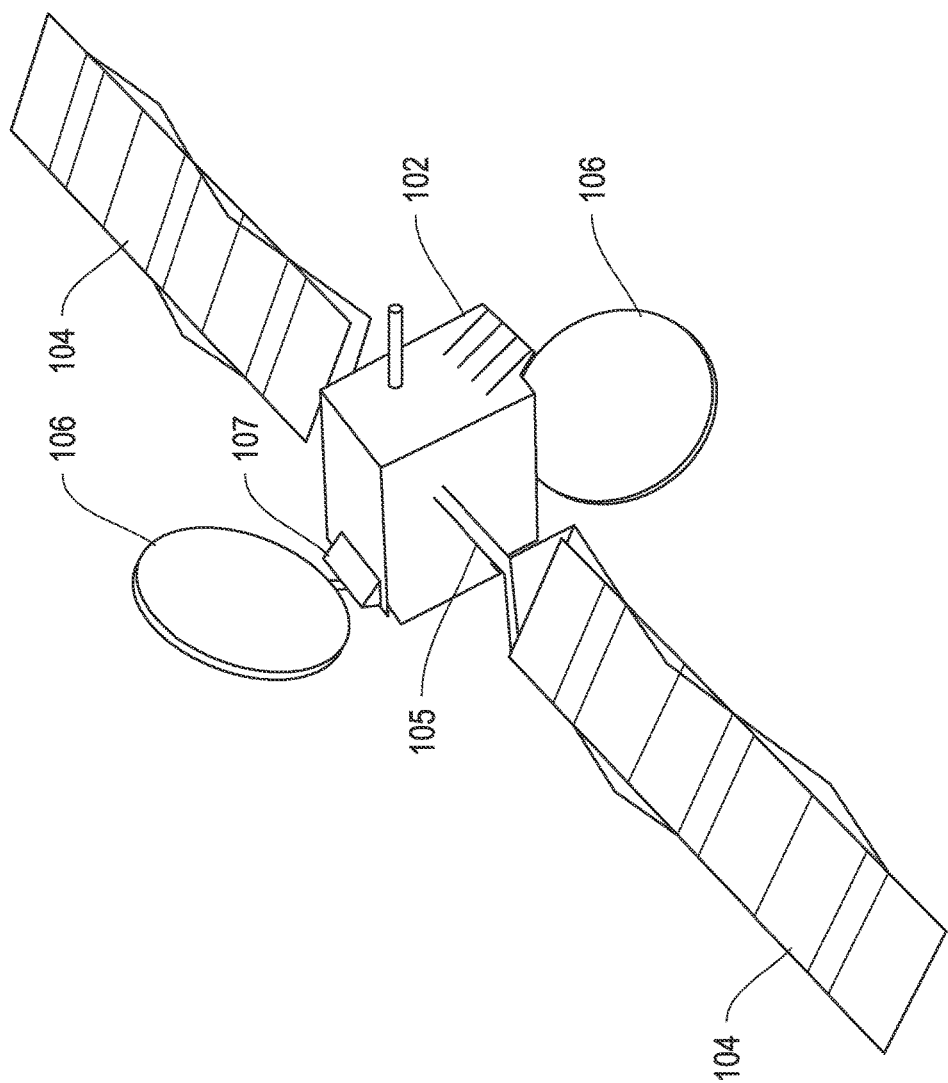
FIG. 1 shows an exemplary embodiment of a satellite.

FIG. 1 shows an exemplary embodiment of a satellite 100. The satellite 100 may comprise satellite body 102, solar panels 104, solar panel mounting system 105, communications antenna 106, and communications antenna mounting system 107. The satellite 100 is provided for illustrative purposes only, and it will be understood that the thruster mounting structure described herein may be integrated into any suitable satellite.

The satellite body 102 may be any suitable shape, including, but not limited to, a cube or a rectangular prism. The solar panels 104 may be configured to generate electric power from incident sunlight and may be mounted on any suitable face(s) of the satellite body 102 through solar panel mounting system 105. The solar panel mounting system 105 may comprise actuators configured to rotate and/or angle the solar panels 104. For example, the solar panel mounting system 105 may rotate or angle the solar panels 104 to track the sun in order to generate the most electric power for the satellite. The solar panel mounting system 105 may also include means for stowing and/or deploying the solar panels 104. For example, the solar panels 104 may be designed to fold for storage and unfold for deployment. The solar panel mounting system 105 may comprise actuators and/or latches to maintain the solar panels in a stowed position until a control signal is received to deploy the solar panels 104. The communications antenna 106 may be any suitable equipment for communicating data from the satellite. For instance, the communications antenna 106 may generate electromagnetic waves directed toward a ground station on Earth in order to communicate with mission control. The communications antenna 106 may be connected to the satellite body 102 through communications antenna mounting system 107. As with the solar panel mounting system 106, the communications antenna mounting system 107 may comprise actuators and/or latches for maintaining the communications antenna 106 in a stowed state (e.g., folded against the satellite body 102) until a control signal is received to deploy the communications antenna 106.

The satellite 100 may also comprise one or more of the thruster mounting structures described in further detail below. The thruster mounting structure(s) may be mounted or integrated on any suitable surface of satellite body 102. For example, two thruster mounting structures may be mounted on the same faces as the solar panels 104, one for each face. In this manner, the pair of thruster mounting structures may work in tandem to position two or more thrusters to provide thruster vectoring for station keeping or orbit raising/transfer maneuvers. The thruster mounting structures may comprise any suitable type of propulsion system. For example, in some embodiments, the thruster mounting structures may comprise electric thrusters. Any suitable type of electric thruster may be utilized, including, but not limited to, ion thrusters, plasma-based thrusters, electrostatic thrusters, electrothermal thrusters, and electromagnetic thrusters. In some embodiments, the satellite 100 may further comprise traditional rocket-based thrusters mounted on any suitable surface of the spacecraft body 102, such that the satellite 100 is propelled by a combination of a chemical-based rocket propulsion system and an electric propulsion system. In these embodiments, the chemical-based rocket propulsion system may be mounted to the satellite body 102 using the thruster mounting structure described herein, or by any other suitable method. In some embodiments, the satellite 100 may comprise only an electric propulsion system. In such embodiments, the satellite 100 may comprise electric thrusters mounted to the satellite body 102 through a thruster mounting structure as described further below, in addition to electric thrusters which are mounted to the satellite body 102 through other means. In this manner, the thruster mounting structures may provide redundant or additional propulsion capacity in addition to a primary propulsion system.

Figure 2:
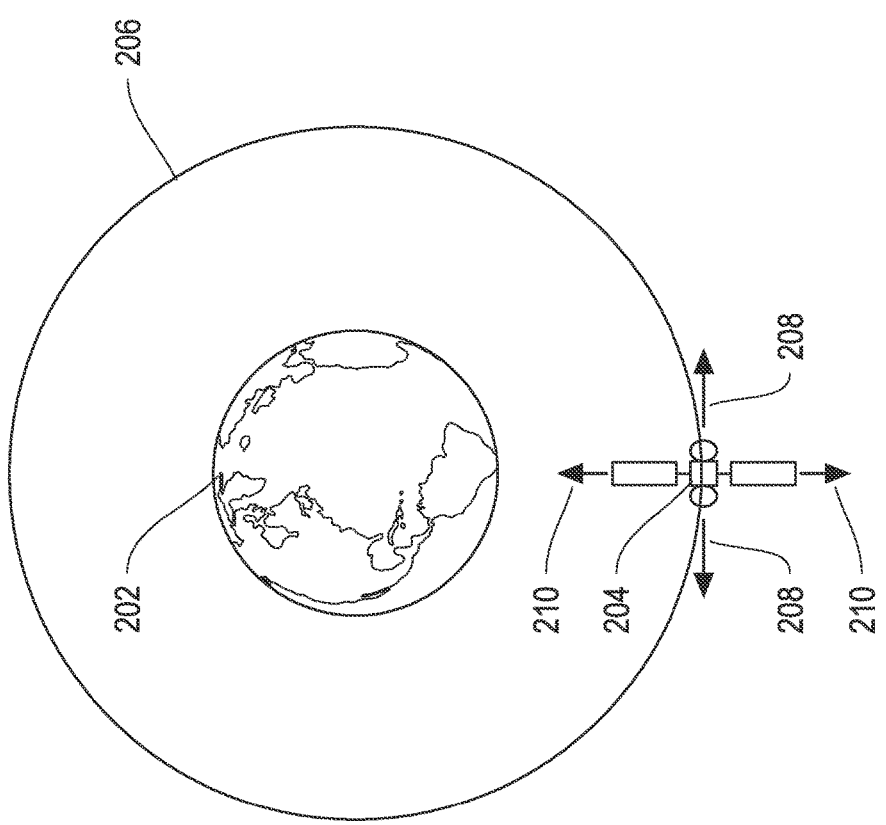
FIG. 2 shows an illustrative diagram of a satellite orbit.

FIG. 2 shows an illustrative diagram of a satellite orbit 200. The satellite 204 may be substantially similar to the satellite 100 described in relation to FIG. 1 and may orbit around celestial body 202. Celestial body 202 may be any suitable celestial body, including, but not limited to, the Earth, the moon, the sun, a planet, a star, or any other celestial body. The satellite 204 may establish an orbit 206 around the celestial body 202. The orbit 206 may comprise one or more of the following orbital characteristics: an altitude, a semi-major axis, an eccentricity, an inclination, and argument of periapsis, a longitude of the ascending node, a time of periapsis passage, a radius of periapsis, and a radius of apoapsis. As an illustrative example, a communications satellite may establish a geostationary (GEO) orbit at an altitude of 35,786 km above the Earth's equator in order to maintain a fixed position above the Earth's surface. As another illustrative example, an earth-mapping satellite may establish a polar orbit with a relatively high inclination (e.g., close to 90 degrees to the equator) so that it passes the equator at a different longitude on each orbit. The orbit 206 may comprise any suitable shape, including a circular orbit, elliptical orbit, or a figure-eight shape.

In order to maintain its orbit, the satellite 204 may perform station keeping maneuvers 208 and 210. As used herein, "station keeping" refers to orbital maneuvers that are required to maintain a desired orbit. Station keeping may be necessary for satellite 204 due to a number of external forces that degrade the orbit of satellite 204, such as air drag, solar radiation pressure, and gravitational forces from the Sun/Moon. In some embodiments, such external forces may decrease or increase the orbit velocity of the satellite 204, causing the altitude (or semi-major axis) of the orbit 206 to decrease or increase accordingly. In such embodiments, the satellite 204 may perform station keeping maneuver 208 in the direction of the orbit or the direction of travel of the satellite 204 in order to increase or decrease the orbit velocity of the satellite 204 and to counteract the external forces. In some embodiments, the satellite 204 may perform station keeping maneuver 208 according to a feedback loop, such that the orbital velocity and/or the altitude of the satellite 204 is sensed, and in response to detecting the that orbital velocity and/or the altitude of the satellite 204 is not the same as the desired orbital velocity or altitude, performing the station keeping maneuver 208. In some embodiments, the feedback loop may comprise communication with a ground station on the celestial body 202 or with another orbiting satellite or spacecraft in order to determine orbital parameters of the satellite 204. The feedback loop as discussed above is provided for illustrative purposes only, and it will be understood that any suitable control scheme may be utilized with station keeping maneuver 208.

In some embodiments, external forces may provide an increase or decrease in the velocity of the satellite 204 in directions other than the direction of travel of the satellite 204. Furthermore, the external forces may impart a net torque or rotation on the satellite 204. In such instances, station keeping maneuver 210 may be used to correct for such velocity or rotation changes. For example, the external forces may affect one or more of the following orbital parameters of orbit 206: an eccentricity, an inclination, and argument of periapsis. As discussed above in relation to station keeping maneuver 208, a feedback loop may be used to correct for the changes in the orbital parameters. In some embodiments, one or more of the orbital parameters may be sensed, either directly by the satellite 204 or by a ground station or another satellite, and in response to determining that the sensed orbital parameter(s) is different than a desired orbital parameter(s), performing station keeping maneuver 210. In some embodiments, a combination of station keeping maneuver 208 and 210 may be utilized to correct for changes in orbital parameter(s). Although station keeping maneuvers 208 and 210 are depicted in FIG. 2 as orthogonal, it will be understood that station keeping maneuvers 208 and 210 may point in any suitable direction for correcting for changes to orbital parameter(s). It will be also understood that station keeping maneuvers 208 and 210 may be produced by any suitable thruster(s), including chemical rocket-based thrusters and electrical thrusters, and any number or combination of thrusters. For instance, some thruster(s) may be configured to point through the center of gravity of the satellite 204 and designed to impart a net velocity on the satellite 204, while some thruster(s) may be configured to provide a thrust vector that does not point through the center of gravity of the satellite 204 and designed to impart a net rotation on the satellite 204. Some thruster(s) may be configured to impart both a net velocity and a net rotation on the satellite 204. Some thruster(s) may be fixed in position or rotation, while other thruster(s) may be mounted or gimbaled in a fashion that allows them to move in at least one of six degrees of freedom (three translational, three rotational). For example, one or more of the thrusters mounted onto satellite 204 may be mounted using the thruster mounting structure described herein.

Figure 3:
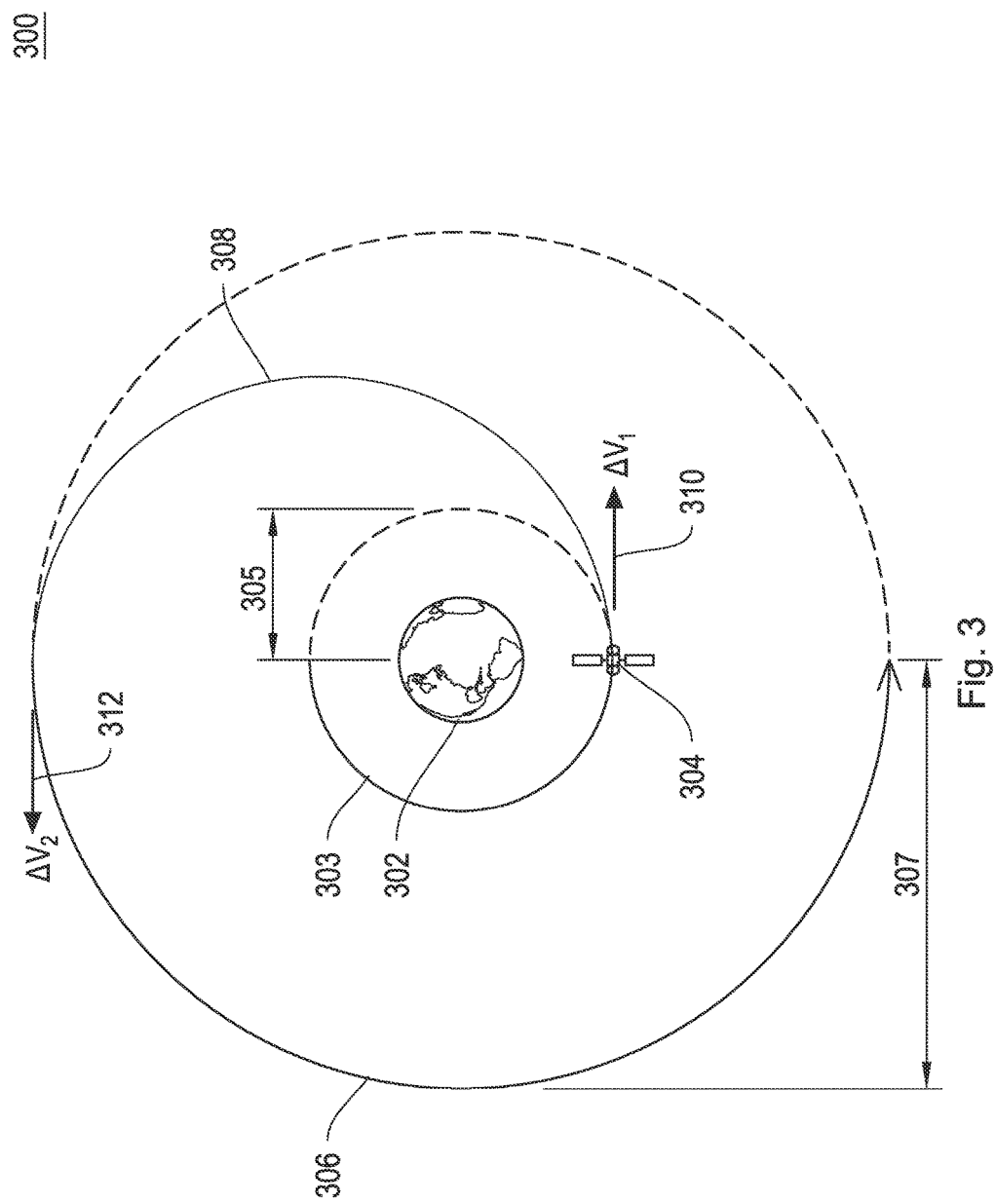
FIG. 3 shows an illustrative diagram of an orbit raising maneuver.

FIG. 3 shows an illustrative diagram of an orbit raising maneuver 300. As used herein, "orbit raising" or "orbit transfer" refers to any orbital maneuver that changes the orbit of the satellite 304 from a first orbit 303 to a second orbit 306. Although the orbit raising maneuver 300 is depicted in FIG. 3 as a Hohmann transfer, it will be understood that the orbit raising maneuver 300 may begin at any initial orbit, be it circular or elliptical, and be any suitable orbital maneuver that changes at least one of the following orbital parameters: an altitude, a semi-major axis, an eccentricity, an inclination, and argument of periapsis, a longitude of the ascending node, a time of periapsis passage, a radius of periapsis, and a radius of apoapsis.

As depicted in FIG. 3, satellite 304 may orbit around celestial body 302 in an initial orbit 303. The satellite 304 may be substantially similar to the satellite 100 depicted in FIG. 1. The celestial body 302 may be substantially similar to celestial body 202 depicted in FIG. 2. The initial orbit 303 may have a radius 305, in addition to other orbital parameters, below that of the final orbit 306. The initial orbit may be an elliptical orbit, in addition to other orbital parameters, with a perigee below the final orbit 306 and an apogee that can be below, at, or above the final orbit 306. The satellite 304 may perform a multitude of thruster firings 310 of finite duration at discrete points in the orbit, continuously over one or more orbital revolutions, or any combination thereof in order to impart the desired change in velocity and reach the final orbit 306. The thruster firing vector 310 may be in the direction of travel of the satellite 304, opposite of the direction of travel of the satellite 304, or any direction in between. The thruster firing vector 310 may be at any angle within the orbit and relative to the orbital plane.

Figure 4:
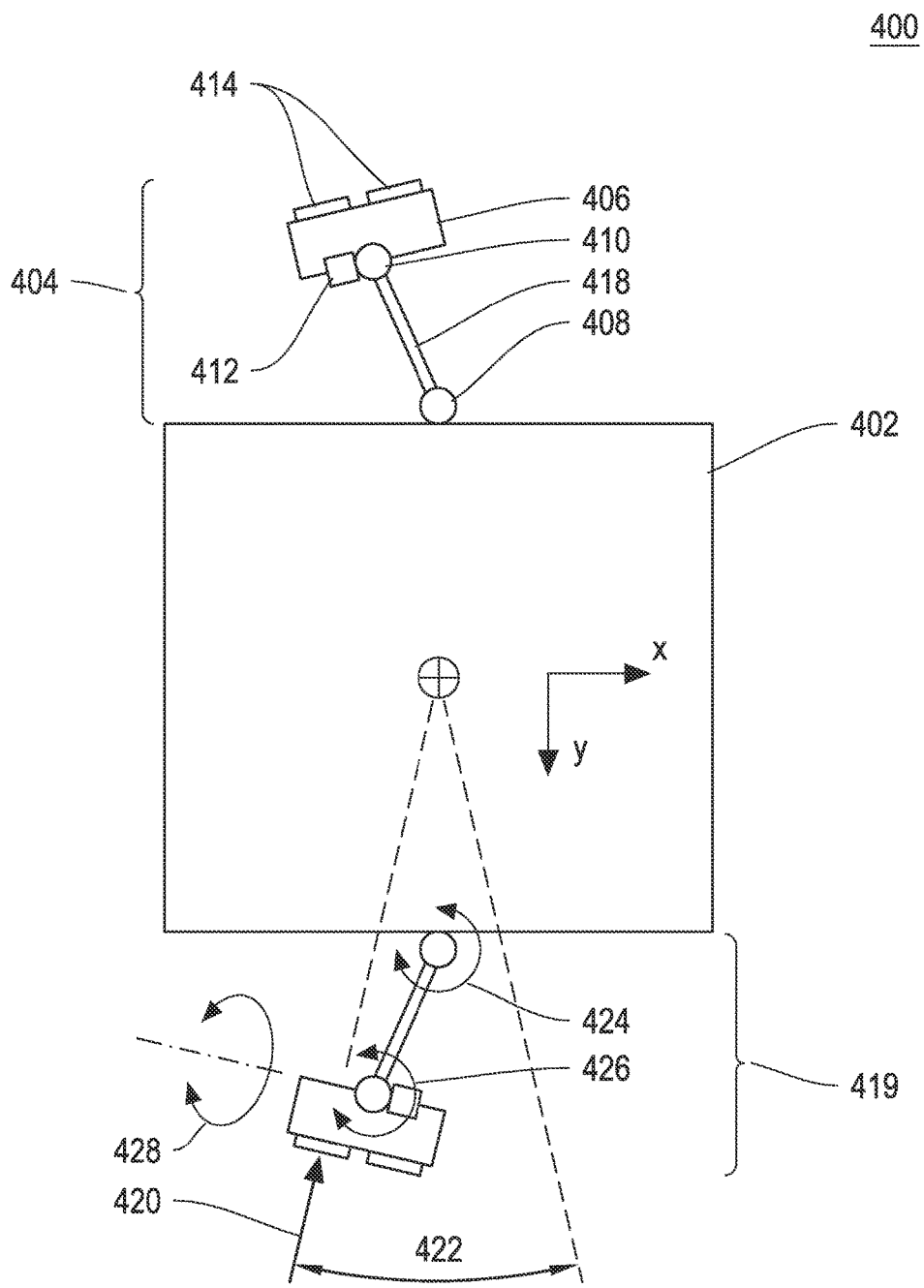
FIG. 4 shows an illustrative diagram of a first and a second thruster mounting structure.

FIG. 4 shows an illustrative diagram of a thruster mounting scheme 400 satellite body 402 comprising a first and a second thruster mounting structure 404. The satellite body 402 may be substantially similar to the satellite body 102 depicted in FIG. 1 and discussed above. The first thruster mounting structure 404 comprises a thruster pallet 406, a first azimuth actuator 408, a second azimuth actuator 410, an elevation actuator 412, thrusters 414, and boom 418. The second thruster mounting structure 419 may comprise substantially the same components as the first thruster mounting structure 404. As depicted in FIG. 4, the first and second thruster mounting structures 404 and 419 may be mounted on opposite faces of the satellite body 402.

The first azimuth actuator 408 may be configured to rotate in a first direction 424. In some embodiments, the direction 424 may be a rotation about the z axis, as depicted in FIG. 4. In some embodiments, the first azimuth actuator 408 is configured to rotate only in the first direction 424. That is, the first azimuth actuator 408 is stiff in rotation to the other two rotational directions. Similarly, the second azimuth actuator 410 may be configured to rotate in a second direction 426, and the elevation actuator 412 may be configured to rotate in direction 428. As with the first azimuth actuator 408, the second azimuth actuator 410 and the elevation actuator 412 may be configured, in some embodiments, to rotate only in the respective directions and to be rigid in the other rotational degrees of freedom. In some embodiments, the first azimuth actuator 408, the second azimuth actuator 410, and the elevation actuator 412 may be motorized actuators configured to receive control signals and/or setpoints for rotational position, rotational speed, and/or rotational acceleration.

The thruster pallet 406 may be made of any suitable material, such as metal, carbon fiber, or composite material. The thruster pallet 406 may be configured into any suitable shape, including a rectangular prism, as depicted in FIG. 4. The thrusters 414 may be mounted directly onto the thruster pallet 406 using any suitable means, including, but not limited to, screws, rivets, bolts, welds, adhesives, or any combination thereof. Although two thrusters 414 are depicted in FIG. 4, it will be understood that any number of thrusters may be mounted onto thruster pallet 406. Furthermore, the thrusters 414 may be any suitable type of thruster, including electric thrusters and/or chemical rocket thrusters.

The boom 418 may be made of any suitable material, such as metal, carbon fiber, or composite material. The boom 418 may be any suitable shape and length. For example, the boom 418 may be a hollow member with a square cross section. The boom 418 may be attached to one or more of the first azimuth actuator 408, the second azimuth actuator 410, and/or the elevation actuator 412 using any suitable means, including, but not limited to, screws, rivets, bolts, welds, adhesives, or any combination thereof. For instance, the boom 418 may be attached to first azimuth actuator 408 such that the first azimuth actuator 408 may pivot the boom in direction 424. The second azimuth actuator 410 may be attached to the thruster pallet 406 by any suitable means, including, but not limited to, screws, rivets, bolts, welds, adhesives, or any combination thereof. The second azimuth actuator 410 may be configured to pivot the thruster pallet 406 in direction 426. In some embodiments, the direction 424 and the direction 426 may be the same. The elevation actuator 412 may be connected to the thruster pallet and/or the second azimuth actuator 410. The elevation actuator 412 may be configured to pivot the thruster pallet 406 in direction 428.

The first azimuth actuator 408 may be attached directly to the satellite body 402 using any suitable means, including, but not limited to, screws, rivets, bolts, welds, adhesives, or any combination thereof. The first azimuth actuator 408 may rotate the thruster pallet 406 in the direction 424 to provide a slew angle 422. The slew angle 422 may allow the thrusters 414 to produce a thrust vector in a direction tangential to the direction of travel or orbital direction. This may enable control of the longitude drift rate and eccentricity vector of the satellite. In some embodiments, the second azimuth actuator 410 may rotate the thruster pallet 406 to provide a thruster direction 420 that points through the center of gravity of the satellite. Although the center of gravity of the satellite is depicted as the center of the square cross-section, the center of gravity may be located at any point within the satellite body 402. In some embodiments, the center of gravity may be outside of the satellite body 402.

Figure 5:
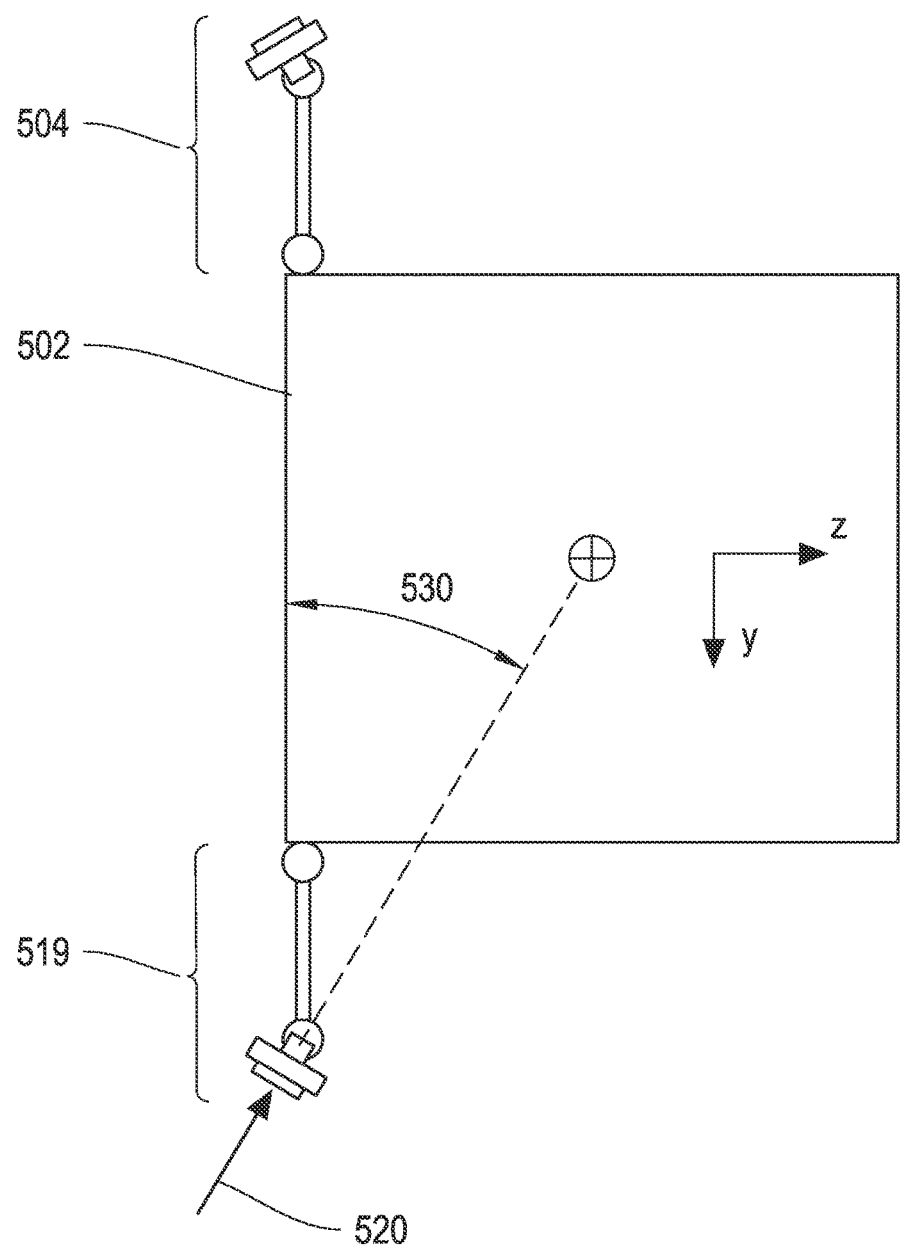
FIG. 5 shows an illustrative diagram of a first and a second thruster mounting structure positioned in a station keeping position.

FIG. 5 shows an illustrative diagram of a thruster mounting scheme 500 including a first and a second thruster mounting structures 504 and 519 positioned in a station keeping position. The first and second thruster mounting structures 504 and 519 may be substantially similar to first and second thruster mounting structures 404 and 419 described in relation to FIG. 4. Satellite body 502 may be substantially similar to satellite body 402 described in relation to FIG. 4. As depicted in FIG. 5, the first and the second thruster mounting structures 504 and 519 may be mounted along one edge of the satellite body 502. In the illustrative example depicted in FIG. 5, the first and second thruster mounting structures 504 and 519 are mounted on the y faces of the satellite body 502. In the station keeping position, first and second thruster mounting structures 504 and 519 may use an elevation actuator, such as elevation actuator 412 depicted in FIG. 4, to pivot the thrusters and produce a thruster vector 520 that points through the center of gravity of the satellite. This may produce cant angle 530, measured as the angle between the thrust vector 520 and an x-y plane of the spacecraft body 502. The cant angle 530 may allow the thrusters 514 to produce a thrust vector that is normal and/or radial to the direction of travel or the orbital direction of the satellite. This may enable control of the orbit inclination and eccentricity vector. In some embodiments, the cant angle 530 may enable simultaneous control of the orbit inclination and eccentricity vector. In some embodiments, the velocity of the satellite may be controlled simultaneously or separately from the angular momentum of the satellite. For example, through the use of cant angle 530 and either the first azimuth actuator 424 or the second azimuth actuator 426, the thrust vector produced by thrusters 414 may be configured to point through the center of gravity, thereby producing a velocity change but no torque, or slightly offset from the center of gravity, thereby producing a net torque. For station keeping maneuvers, the thruster associated with either the first thruster mounting structure 504 or the second thruster mounting structure 519, or both, may be fired. As discussed above in relation to FIG. 2, the thruster firings may be performed in order to maintain a certain orbit or orbit characteristics. Through the use of cant angle 530 and slew angle 422 depicted in FIG. 4, a wide range of control options may be enabled for controlling the satellite body 502, thereby allowing for mission optimization and reduced propellant consumption. In some embodiments, full station keeping operations may be completed by the use of two thrusters and two maneuvers per day or orbital period. In some embodiments, the first and a second thruster mounting structures 504 and 519 may be configured to control six degrees of freedom (three translational, three rotational) of the satellite body 502. Thus, full orbital and station keeping control may be achieved using only two thrusters.

Figure 6:
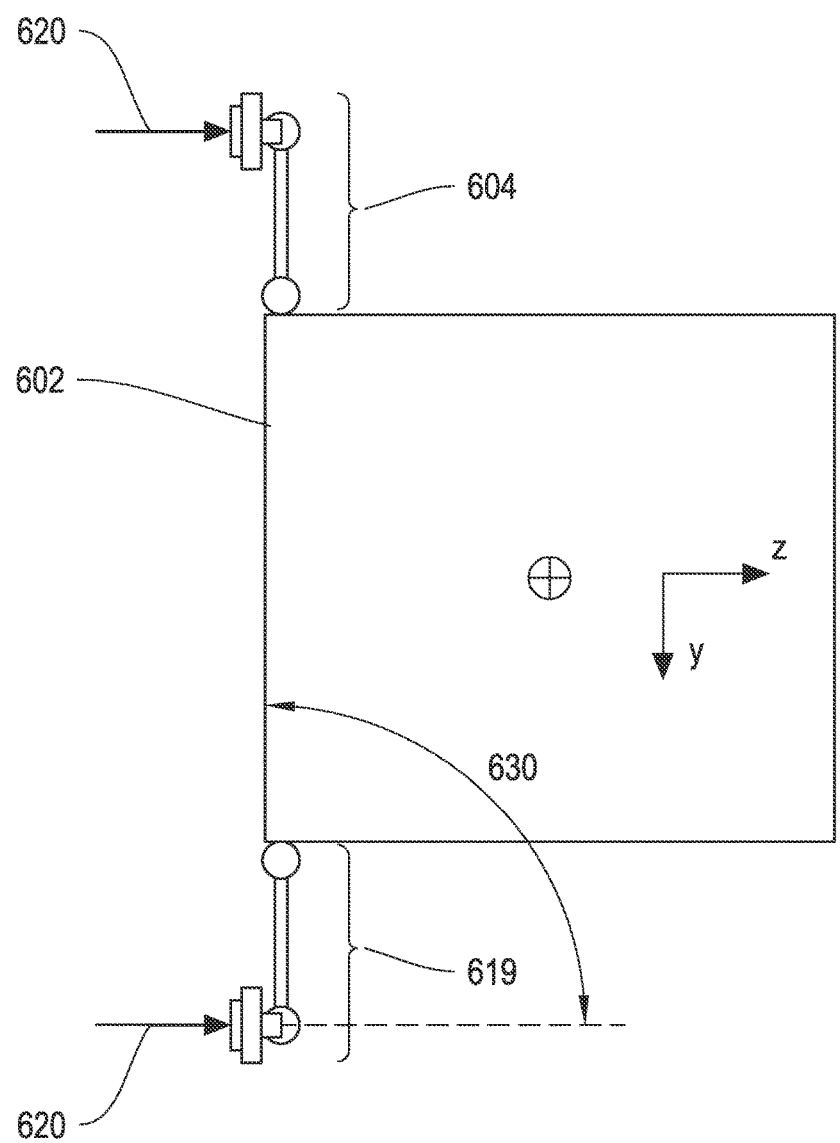
FIG. 6 shows an illustrative diagram of a first and a second thruster mounting structure positioned in an orbit raising position.

FIG. 6 shows an illustrative diagram of a thruster mounting scheme 600 including a first and a second thruster mounting structure 604 and 619 positioned in an orbit raising position. The first and second thruster mounting structures 604 and 619 may be substantially similar to first and second thruster mounting structures 404 and 419 described in relation to FIG. 4. Satellite body 602 may be substantially similar to satellite body 402 described in relation to FIG. 4. As depicted in FIG. 6, the first and the second thruster mounting structures 604 and 619 may be mounted along one edge of the satellite body 602. In the illustrative example depicted in FIG. 6, the first and second thruster mounting structures 604 and 619 are mounted on the y faces of the satellite body 602. In the orbit raising position, first and second thruster mounting structures 604 and 619 may use an elevation actuator, such as elevation actuator 412 depicted in FIG. 4, to pivot the thrusters so that they produce a thrust vector 620 substantially in the z direction of the vehicle 602 as depicted in FIG. 6. In some embodiments, the z-direction may be the direction of travel, opposite the direction of travel, or anywhere in between. The cant angle 630 created between the thrust vector 620 and the x-y plane of satellite body 602 may be substantially 90 degrees. In some embodiments, the cant angle may point in other directions up to and including the direction through the center of gravity of the vehicle 520 as shown in FIG. 5. For orbit raising maneuvers, either one, or both, of the thrusters associated with the first and the second thruster mounting structures 604 and 619 may be fired. As discussed above in relation to FIG. 3, the thruster firings may be performed in order to change the orbit of the satellite from an initial orbit to a final orbit, and/or to change certain orbit characteristics.

Figure 7:
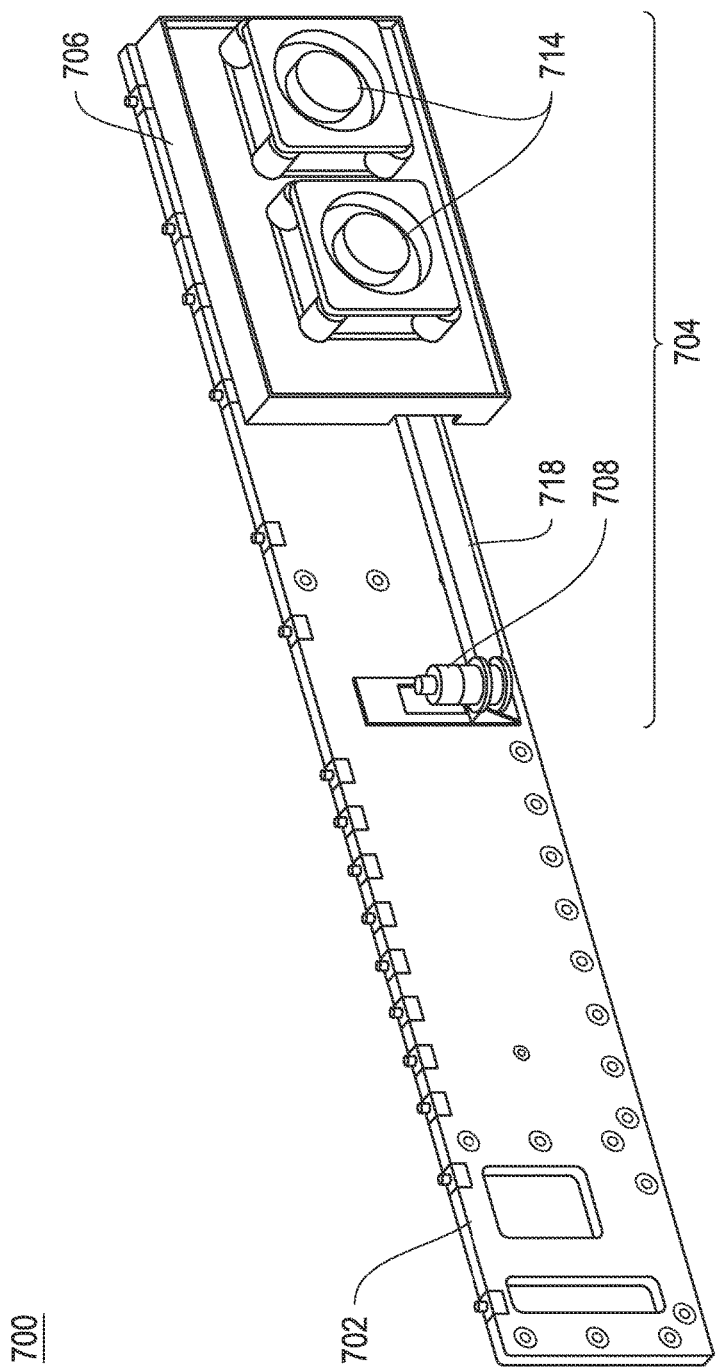
FIG. 7 shows an illustrative diagram of a thruster mounting structure positioned in a stowed position.

FIG. 7 shows an illustrative diagram of a thruster mounting structure 704 positioned in a stowed position. The thruster mounting scheme 700, including the spacecraft body 702, the thruster mounting structure 704, the first azimuth actuator 708, the boom 718, the thruster pallet 706, and the thrusters 714, may be substantially similar to the corresponding components discussed above in relation to FIG. 4. In the stowed position depicted in FIG. 7, the boom may be substantially parallel to the satellite body 702. In some embodiments, the boom 718 may be in contact with the satellite body 702. In some embodiments, the boom 718 may be a spaced distance apart from satellite body 702. In some embodiments, the thruster pallet 706 may be aligned such that the thrusters 714 are substantially parallel to the satellite body 702, with thrust vectors that point substantially perpendicular to the satellite body 702. In some embodiments, the thruster pallet 706 may be attached to the satellite body 702 using a mounting structure. For instance, the mounting structure may include actuators intended to keep the thruster pallet 706 in place during launch, and to deploy the thruster pallet 706 at the appropriate time(s) during the satellite's mission.

Figure 8:
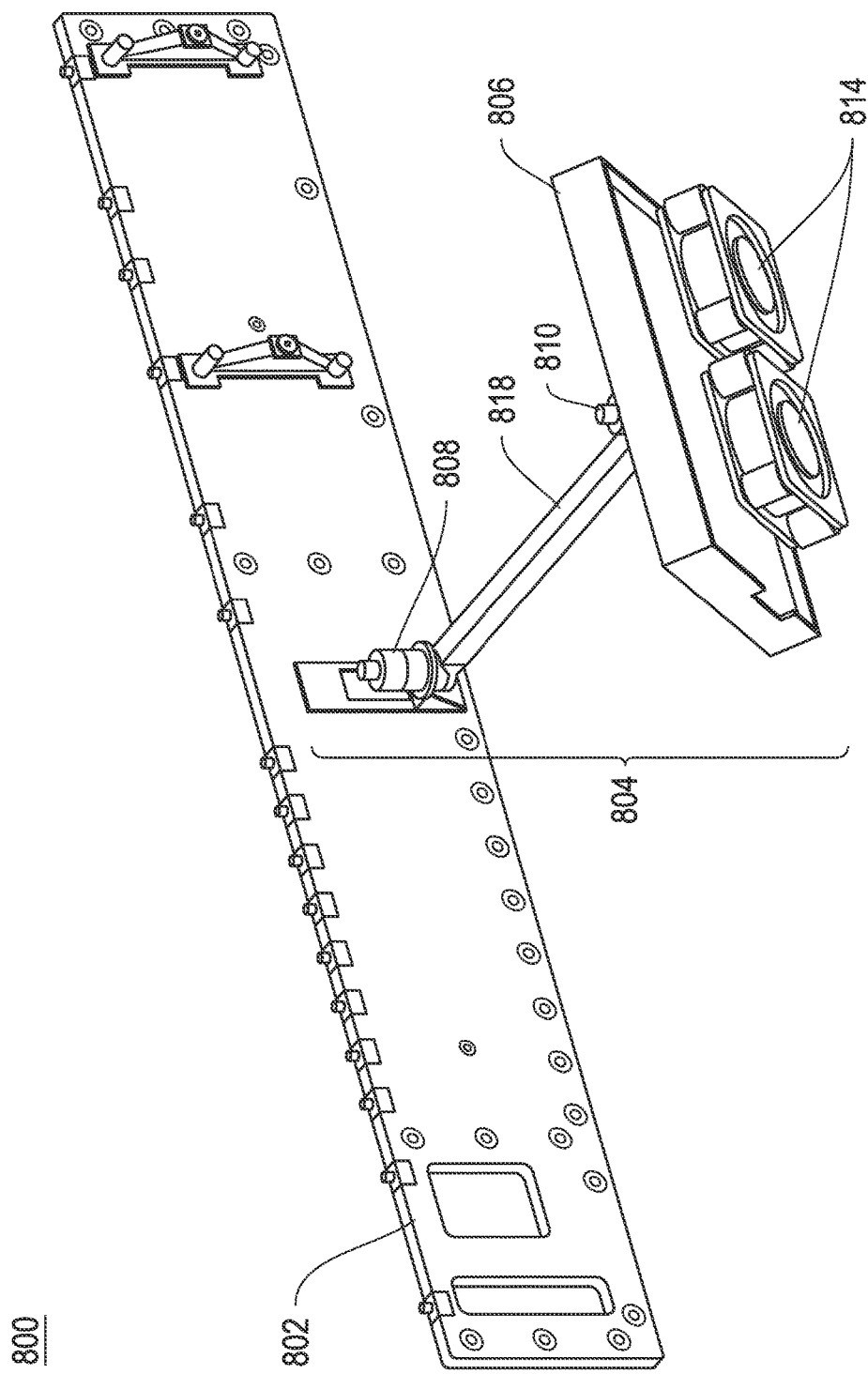
FIG. 8 shows an illustrative diagram of a thruster mounting structure positioned in a station keeping position.

FIG. 8 shows an illustrative diagram of a thruster mounting structure 804 positioned in a station keeping position. The thruster mounting scheme 800, including the spacecraft body 802, the thruster mounting structure 804, the first azimuth actuator 808, the boom 818, the second azimuth actuator 810, the thruster pallet 806, and the thrusters 814, may be substantially similar to the corresponding components discussed above in relation to FIG. 4. In the station keeping position depicted in FIG. 8, the first azimuth actuator 808 may rotate the boom 818 out from the satellite body 802. Although the boom 818 in FIG. 8 is depicted as substantially perpendicular to satellite body 802, it will be understood that the boom 818 may be rotated to other angles in the station keeping position. In some embodiments, the second azimuth actuator 810, and an elevation actuator, such as elevation actuator 412 depicted in FIG. 4, may be used to rotate the thruster pallet 806 so that the thrust vector is not perpendicular to the satellite body 802. It will be understood that the first azimuth actuator 808, the second azimuth actuator 810, and the elevation actuator may be utilized to rotate the thruster pallet into a variety of positions in order to correct for deviations in one or more orbital parameters, as discussed above in relation to FIG. 2.

FIG. 9 shows an illustrative diagram of a thruster mounting structure 904 positioned in an orbit raising position. The thruster mounting scheme 900, including the spacecraft body 902, the thruster mounting structure 904, the first azimuth actuator 908, the boom 918, the second azimuth actuator 910, the elevation actuator 912, the thruster pallet 806, and the thrusters 914, may be substantially similar to the corresponding components discussed above in relation to FIG. 4. In the orbit raising position depicted in FIG. 8, the first azimuth actuator 908 may rotate the boom 918 out from the satellite body 902. Although the boom 918 in FIG. 9 is depicted as substantially perpendicular to satellite body 902, it will be understood that the boom 918 may be rotated to other angles in the orbit raising position. In some embodiments, the second azimuth actuator 910 and the elevation actuator 912 may be used to rotate the thruster pallet 906 so that the thrust vector is substantially parallel to the satellite body 902. As depicted in FIG. 9, the boom 918 may position the thruster pallet 906 and the thrusters 914 a spaced distance from the satellite body 902. In some embodiments, the thrusters 914 produce a combined thrust vector that is substantially in line with the z-direction of the vehicle In some embodiments, the individual thruster may be rotated such that the individual thrust vector points anywhere between the z-direction and the direction through the center of gravity of the vehicle. As discussed above in relation to FIG. 3, the thrust in this orientation may be used to change the orbit of the satellite from an initial orbit to a final orbit.

Figure 10A:
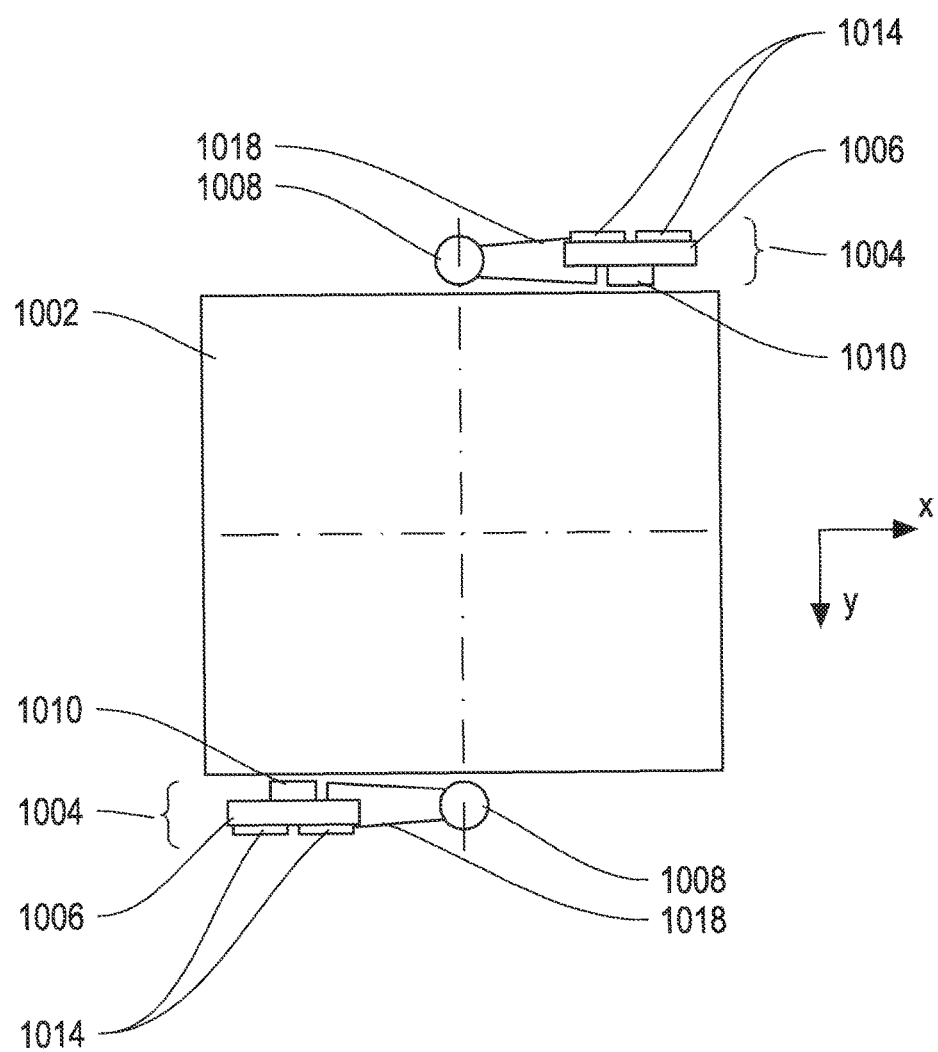
FIGS. 10A-E show illustrative diagrams of a first and a second thruster mounting structure in various positions.

FIGS. 10A-E show illustrative diagrams 1000 of a first and a second thruster mounting structures 1004 in various positions. The spacecraft body 1002, the thruster mounting structure 1004, the first azimuth actuator 1008, the boom 1018, the second azimuth actuator 1010, the thruster pallet 1006, and the thrusters 1014, may be substantially similar to the corresponding components discussed above in relation to FIG. 4. FIG. 10A depicts the first and second thruster mounting structures 1004 in a stowed position. As discussed above in relation to FIG. 7, in the stowed position, the boom 1018 may be substantially parallel and/or flush with the satellite body 1002. The thruster pallet 1006 may be rotated to be parallel along its longest edge and such that the thrusters point outwards from the satellite body 1002. As discussed in relation to FIG. 7, the thruster pallet 1006 may be secured to the satellite body 1002 using a mounting scheme, wherein the mounting scheme is configured to release or deploy the thruster pallet 1006 at an appropriate time(s) during the satellite's mission. In this manner, the stowed position may minimize the storage space required and minimize any adverse forces imparted on the thruster pallet 1006, for example, during launch.

Figure 10B:
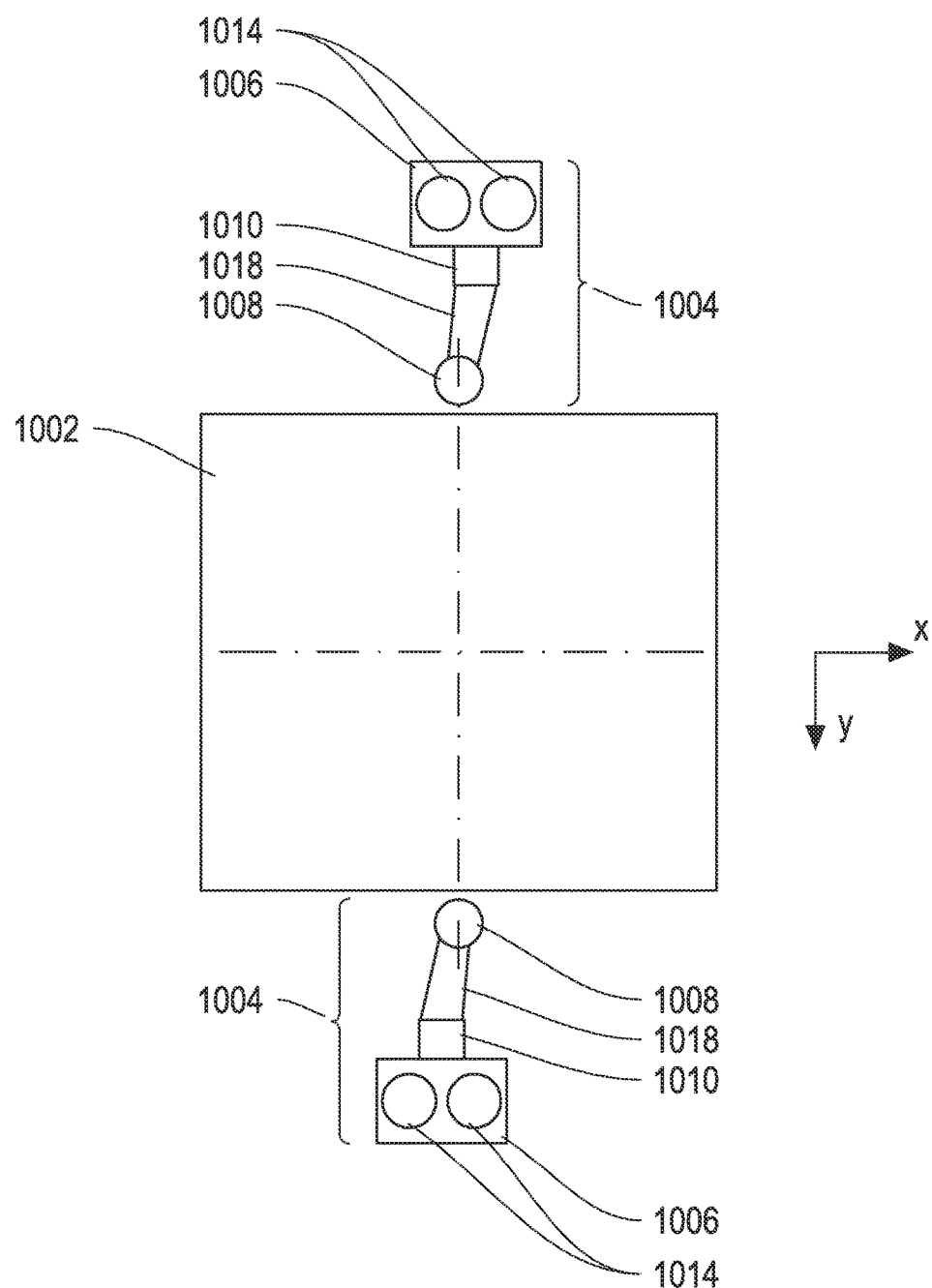

FIG. 10B depicts the first and second thruster mounting structures 1004 in an orbit raising position. As discussed above in relation to FIGS. 6 and 9, in the orbit raising position, the thrusters 1014 may be rotated such that the combined thruster vector points substantially in the z-direction. In some embodiments, the thrusters may be rotated such that the individual thrust vector points anywhere between the z-direction and the direction through the center of gravity of the vehicle. As discussed above in relation to FIG. 3, the thrust in the z-direction may increase the velocity of the satellite and result in a change of orbit. As depicted in FIG. 10B, the boom 1018 may not be perpendicular to the x-z fact of the satellite body 1002. In some embodiments, for orbit raising maneuvers, both of the thrusters associated with the first and the second thruster mounting structure may be fired in order to reduce any unwanted rotation on the satellite body 1002.

Figure 10C:
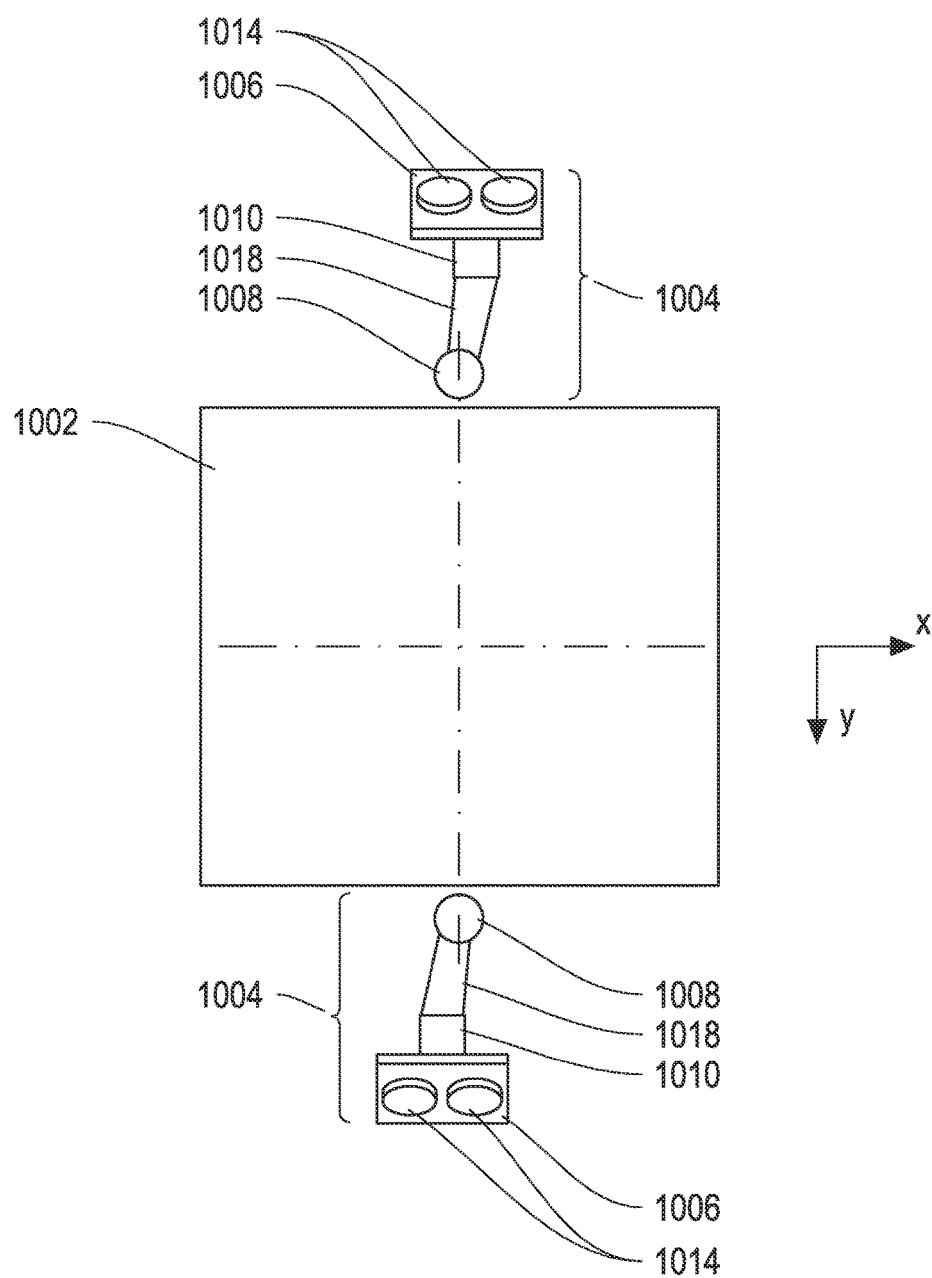

FIG. 10C depicts the first and second thruster mounting structures 1004 in a station keeping position. As discussed above in relation to FIGS. 5 and 8, in the station keeping position, the thrusters 1014 may be rotated into a variety of positions to correct for deviations in certain orbit parameters. In the position depicted in FIG. 10C, the first and second thruster mounting structures 1004 may correct for deviations in both inclination and eccentricity. For instance, the orientation of the thrusters 1014 may produce forces in both the z direction and the y direction, which may compensate for external forces in those directions. As depicted in FIG. 10C, the boom 1018 may not be perpendicular to the x-z fact of the satellite body 1002. In some embodiments, for station keeping maneuvers, one or both the of the thrusters associated with the first and the second thruster mounting structure may be fired as needed to correct for orbital deviations.

Figure 10D:
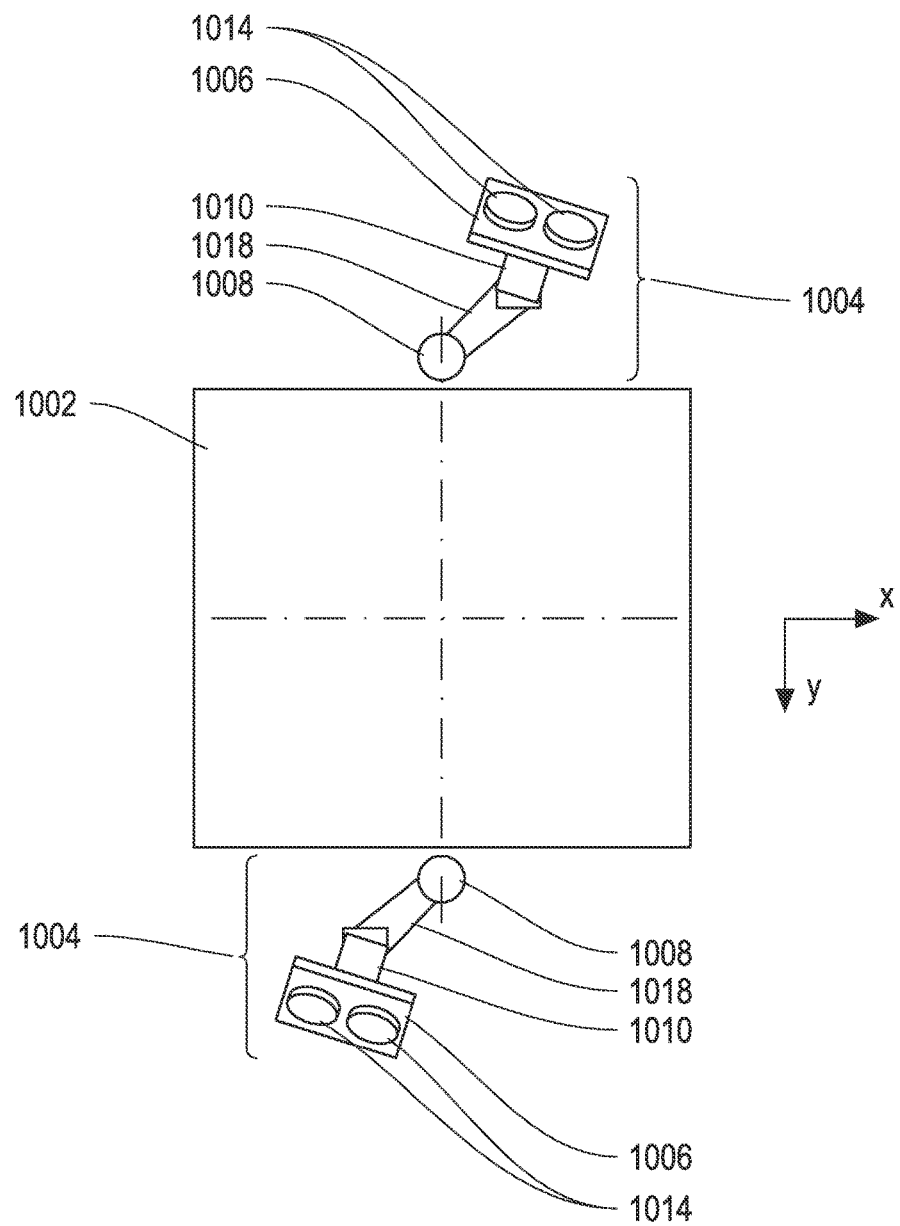
Figure 10E:
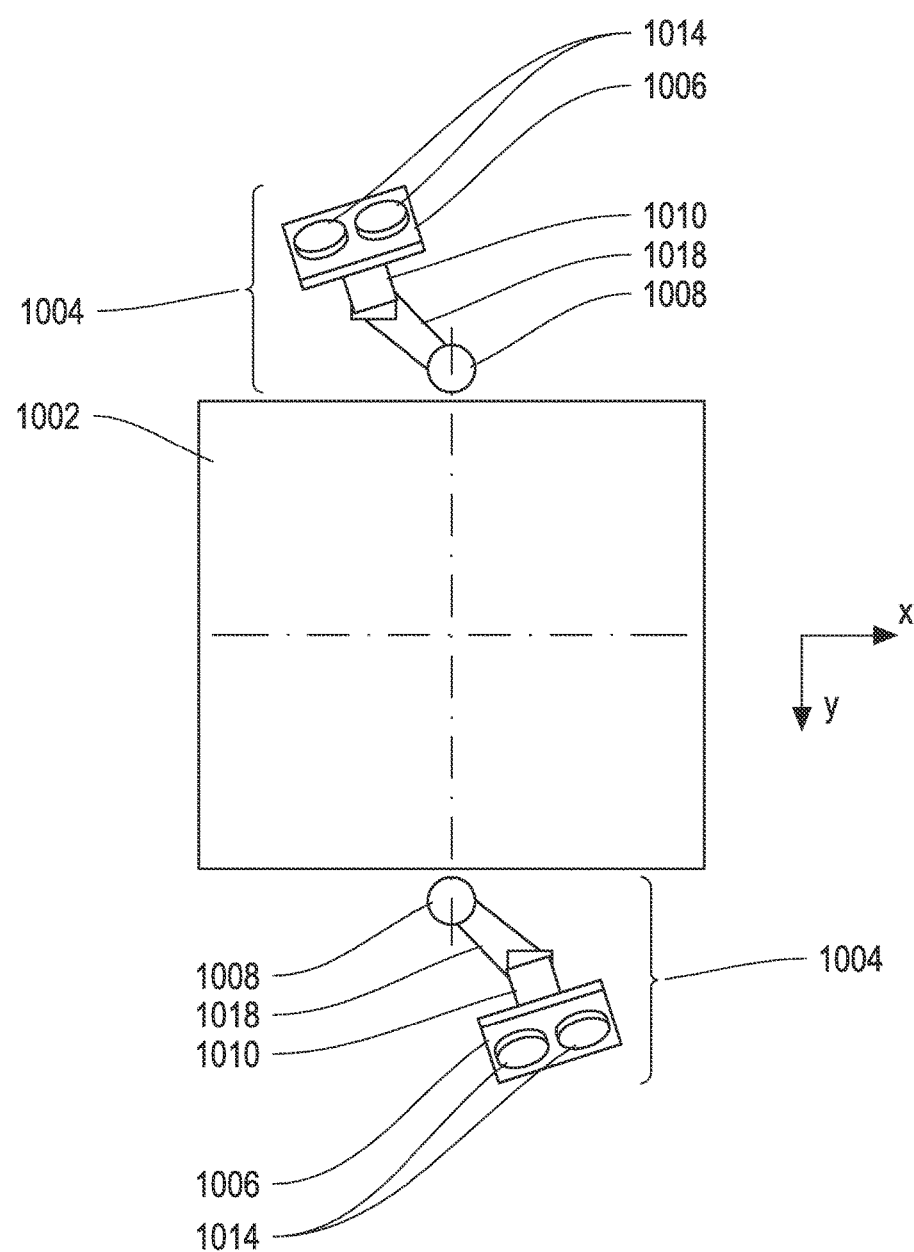

FIGS. 10D and E depict the first and second thruster mounting structures 1004 in other station keeping positions. As discussed above in relation to FIGS. 5 and 8, in the station keeping position, the thrusters 1014 may be rotated into a variety of positions to correct for deviations in certain orbit parameters. In the positions depicted in FIGS. 10D and E, the first and second thruster mounting structures 1004 may correct for deviations in inclination, eccentricity, and drift. For instance, the orientation of the thrusters 1014 may produce forces in all of the x, y, and z directions, which may compensate for external forces in those directions. The angle of the thrust vector may be controlled using the first azimuth actuator 1008, the second azimuth actuator 1010, and an elevation actuator such as elevation actuator 412 depicted in FIG. 4. As depicted in FIGS. 10D and E, the boom 1018 may not be perpendicular to the x-z fact of the satellite body 1002. In some embodiments, for station keeping maneuvers, one or both the of the thrusters associated with the first and the second thruster mounting structure may be fired as needed to correct for orbital deviations.

In some embodiments, depending on the location of the center of gravity of the satellite, the orientations depicted in FIGS. 10B, C, D and E may also impart a net torque and/or rotation on the satellite body 1002.

It will be apparent to those skilled in the art that the embodiments described herein are provided by way of example only. It should be understood that numerous variations, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. A system for mounting a thruster onto a vehicle, the system comprising:
    a first thruster mounting structure, the first thruster mounting structure comprising:
        a first rotational joint attached to a vehicle, the first rotational joint configured to rotate in a first axis;
        a boom connected to the first rotational joint, wherein the first rotational joint is configured to pivot the boom about the first axis;
        a second rotational joint, the second rotational joint attached to the boom and configured to rotate in the first axis;
        a third rotational joint attached to the second rotational joint, the third rotational joint configured to rotate in a second axis that is perpendicular to the first axis, wherein the second rotational joint is configured to pivot the third rotational joint about the first axis;
        a thruster pallet attached to the third rotational joint, wherein the third rotational joint is configured to pivot the thruster pallet about the second axis; and
        a thruster fixedly attached to the thruster pallet.

2. The system of claim 1, wherein the thruster pallet comprises a rectangular face, and wherein the third rotational joint is configured to attach to the thruster pallet along a long edge of the rectangular face.

3. The system of claim 1, wherein the first thruster mounting structure is arranged in a stowed position such that the boom is positioned substantially parallel and flush to the vehicle and the thruster pallet is connected to the vehicle.

4. The system of claim 3, wherein the thruster pallet is flush to the vehicle.

5. The system of claim 3, wherein the thruster is facing a direction substantially perpendicular to the vehicle.

6. The system of claim 1, wherein the first thruster mounting structure is arranged into a station keeping position such that the boom is positioned not parallel to the vehicle.

7. The system of claim 6, wherein the thruster is configured so that a thrust vector generated by the thruster points through a center of gravity of the vehicle.

8. The system of claim 1, wherein the first thruster mounting structure is arranged into an orbit raising position such that the boom is positioned substantially perpendicular to the vehicle.

9. The system of claim 8, wherein the thruster pallet is pointing in a direction substantially parallel to the vehicle.

10. The system of claim 8, wherein the thruster is spaced a distance away from the vehicle.

11. The system of claim 1, wherein the first axis is one of: a roll axis of the vehicle or a yaw axis of the vehicle.

12. The system of claim 1, wherein the second axis is perpendicular to the first axis anywhere within the pitch-yaw plane or pitch-roll plane of the vehicle.

13. The system of claim 1, wherein the first rotational joint and the second rotational joint are motorized rotational joints.

14. The system of claim 1, wherein the thruster is an electric thruster.

15. The system of claim 1, wherein the vehicle is a satellite.

16. The system of claim 1, wherein a second thruster is attached to the thruster pallet.

17. The system of claim 16, wherein the second thruster is substantially identical to the thruster.

18. The system of claim 1, further comprising a second thruster mounting structure, the second thruster mounting structure comprising:
- a fourth rotational joint attached to a vehicle, the fourth rotational joint configured to rotate in the first axis;
- a second boom connected to the fourth rotational joint, wherein the fourth rotational joint is configured to pivot the boom about the first axis;
- a fifth rotational joint, the fifth rotational joint attached to the second boom and configured to rotate in the first axis;
- a sixth rotational joint attached to the fifth rotational joint, the sixth rotational joint configured to rotate in the second axis, wherein the fifth rotational joint is configured to pivot the sixth rotational joint about the first axis;
- a second thruster pallet attached to the sixth rotational joint, wherein the sixth rotational joint is configured to pivot the second thruster pallet about the second axis; and
- a second thruster fixedly attached to the second thruster pallet.

19. The system of claim 18, wherein the vehicle comprises a rectangular prism, and wherein the first thruster mounting structure and the second thruster mounting structure are mounted on opposing faces of the rectangular prism.

20. The system of claim 19, wherein the first thruster and the second thruster are configured to control six degrees of freedom of the vehicle.

\* \* \* \* \*